United States Patent
Zhang et al.

(10) Patent No.: US 8,068,619 B2
(45) Date of Patent: Nov. 29, 2011

(54) METHOD AND APPARATUS FOR NOISE SUPPRESSION IN A SMALL ARRAY MICROPHONE SYSTEM

(75) Inventors: Ming Zhang, Cupertino, CA (US); Xiaoyan Lu, Nanjing (CN)

(73) Assignee: Fortemedia, Inc., Cupertino, CA (US)

( * ) Notice: Subject to any disclaimer, the term of this patent is extended or adjusted under 35 U.S.C. 154(b) by 1334 days.

(21) Appl. No.: 11/620,573

(22) Filed: Jan. 5, 2007

(65) Prior Publication Data
US 2008/0317259 A1 Dec. 25, 2008

Related U.S. Application Data

(60) Provisional application No. 60/746,783, filed on May 9, 2006.

(51) Int. Cl.
*H04R 3/00* (2006.01)
(52) U.S. Cl. ............... 381/92; 381/110; 704/214
(58) Field of Classification Search ............ 381/94.1, 381/92, 91, 56, 57, 111, 122, 110; 704/226, 704/214, 233, 231, 208
See application file for complete search history.

(56) References Cited

U.S. PATENT DOCUMENTS

| | | | | |
|---|---|---|---|---|
| 6,138,091 A | * | 10/2000 | Haataja et al. | 704/215 |
| 6,295,364 B1 | * | 9/2001 | Finn et al. | 381/110 |
| 7,565,288 B2 | * | 7/2009 | Acero et al. | 704/226 |

* cited by examiner

*Primary Examiner* — Vivian Chin
*Assistant Examiner* — Con P Tran

(57) ABSTRACT

A small array microphone system includes an array microphone having a plurality of microphones and operative to provide a plurality of received signals, each microphone providing one received signal. A first voice activity detector (VAD) provides a first voice detection signal generated using the plurality of received signals to indicate the presence or absence of in-beam desired speech. A second VAD provides a second voice detection signal generated using the plurality of received signals to indicate the presence or absence of out-of-beam noise when in-beam desired speech is absent. A reference signal generator provides a reference signal based on the first voice detection signal, the plurality of received signals, and a beamformed signal, wherein the reference signal has the desired speech suppressed. A beamformer provides the beamformed signal based on the second voice detection signal, the reference signal, and the plurality of received signals, wherein the beamformed signal has noise suppressed. A multi-channel noise suppressor operative to further suppress noise in the beamformed signal and provide an output signal. A speech reliability detector provides a reliability detection signal indicating the reliability of each frequency subband. The first voice detection signal, the second voice detection signal, the reliability detection signal and the output signal are provided to the speech recognition engine.

24 Claims, 5 Drawing Sheets

US 8,068,619 B2

METHOD AND APPARATUS FOR NOISE SUPPRESSION IN A SMALL ARRAY MICROPHONE SYSTEM

CROSS-REFERENCE TO RELATED APPLICATION

This application claims the benefit of provisional U.S. Application Ser. No. 60/746,783, filed on May 9, 2006, which is incorporated herein by reference in its entirety.

BACKGROUND

The present invention relates generally to signal processing, and more specifically to a method and apparatus for noise suppression in a small array microphone system for use with a speech recognition engine.

In recent years, speech control, speech input and voice activation applications have become increasingly popular in many areas, such as hands-free communication systems, remote controllers, automobile navigation systems and telephone server services. However, current speech recognition technology does not work well under real-world environments where noise and interference degrade the performance of the speech recognition engine. To address this problem, conventional art uses front-end noise suppression processing to enhance the speech signal before inputting it into a speech recognition system. Because one-microphone solutions cannot effectively deal with noise, particularly non-stationary noise such as other voices and music, array microphones are used in the conventional art to improve the performance of speech recognition systems in adverse environments. Array microphones utilize not only temporal and spectral information, but also spatial information to suppress noise and interference to get much cleaner enhanced speech and provide more accurate voice activity detection (VAD) for a speech recognition engine.

FIG. 1 shows a diagram of a conventional array microphone system 100 for speech recognition application. System 100 includes multiple (N) microphones 112a through 112n, which are placed at different positions. The spacing between microphones 112 is required to be at least a minimum distance of D for proper operation. A preferred value for D is half of the wavelength of the band of interest for the signal. Microphones 112a through 112n receive desired speech activity, local ambient noise, and unwanted interference. The N received signals from microphones 112a through 112n are amplified by N amplifiers (AMP) 114a through 114n, respectively. The N amplified signals are further digitized by N analog-to-digital converters (A/Ds or ADCs) 116a through 116n to provide N digitized signals $s_1(n)$ through $s_N(n)$.

The N received signals, provided by N microphones 112a through 112n placed at different positions, carry information for the differences in the microphone positions. The N digitized signals $s_1(n)$ through $s_N(n)$ are provided to a beamformer 118 and used to get the single-channel enhanced speech for VAD. The enhanced single-channel VAD signal is supplied to both the adaptive noise suppression filter 120 and the speech recognition engine 122. The adaptive noise suppression filter 120 processes the multi-channel signals $s_1(n)$ through $s_N(n)$ to reduce the noise component, while boosting the signal-to-noise ratio (SNR) of the desired speech component. This beamforming is used to suppress noise and interference outside of the beam and to enhance the desired speech within the beam. Beamformer 118 may be a fixed beamformer (e.g., a delay-and-sum beamformer) or an adaptive beamformer (e.g., an adaptive sidelobe cancellation beamformer). These various types of beamformer are well known in the art.

The conventional array microphone system 100 for a speech recognition engine is associated with several limitations that curtail its use and/or effectiveness, including (1) it does not provide VAD information for in-beam and out-of-beam signals, (2) the requirement of a minimum distance of D for the spacing between microphones, (3) it does not have a noise suppression control unit to control noise suppression for different situations and based on noise source positions and (4) marginal effectiveness for diffused noise.

Thus, techniques that can more effectively cancel noise for speech recognition systems are highly desirable.

SUMMARY

The present invention satisfies the foregoing needs by providing improved systems and methods for speech recognition and suppression of noise and interference using a small array microphone.

In embodiments of the invention, a small array microphone system for use with a speech recognition engine includes an array microphone comprising a plurality of microphones and operative to provide a plurality of received signals, each microphone providing one received signal. A first voice activity detector (VAD) provides a first voice detection signal generated using the plurality of received signals to indicate the presence or absence of in-beam desired speech. A second VAD provides a second voice detection signal generated using the plurality of received signals to indicate the presence or absence of out-of-beam noise when in-beam desired speech is absent. A reference signal generator provides a reference signal based on the first voice detection signal, the plurality of received signals, and a beamformed signal, wherein the reference signal has the desired speech suppressed. The reference signal generator is thus operative to provide a reference signal substantially comprising noise. A beamformer provides the beamformed signal based on the second voice detection signal, the reference signal, and the plurality of received signals, wherein the beamformed signal has noise suppressed. The beamformer is thus preferably operative to provide beamformed signal substantially comprising desired speech. A multi-channel noise suppressor further suppresses noise in the beamformed signal and provides an output signal. A speech reliability detector provides a reliability detection signal indicating the reliability of each frequency subband. The first voice detection signal, the second voice detection signal, the reliability detection signal and the output signal are provided to the speech recognition engine.

The first voice detection signal is preferably determined based on a ratio of the total power of the received signals over noise power, while the second voice detection signal is preferably determined based on a ratio of cross-correlation between a desired signal and a main signal over total power.

In a preferred embodiment of the invention, the plurality of signals comprise a main signal and at least one secondary signal. The main signal may be provided by a unidirectional microphone facing the desired speech source, and the at least one secondary signal may be provided by at least one omnidirectional microphone. Alternately, the main signal may be provided by a uni-directional microphone facing the desired speech source, and the at least one secondary signal may be provided by at least one unidirectional microphone facing away from the desired speech source. In another embodiment, the main signal may be provided by subtracting the signal provided by a front omni-directional microphone from the signal provided by a back omni-directional microphone, and the at least one secondary signal may be the signal provided by one of the front omni-directional microphone and the back omni-directional microphone. In still another embodiment, the main signal may be provided by an omni-directional microphone, and the at least one secondary signal may be provided by at least one unidirectional microphone facing away from the desired speech source.

A noise suppression controller preferably controls the level of noise suppression performed by the multi-channel noise suppressor. Furthermore, in one preferred embodiment of the present invention, a mixer provides a mixed output signal of specified format using the output signal, the reliability detection signal, and the first and second voice detection signals.

In embodiments of the present invention, the reference signal generator and the beamformer are operative to perform time-domain signal processing, while the multi-channel noise suppressor is operative to perform frequency domain signal processing.

In other embodiments of the invention, a method of suppressing noise and interference using a small array microphone is provided. A plurality of received signals are received from a plurality of microphones forming an array microphone. First and second voice detection signals are generated, wherein the first voice detection signal is generated using the plurality of received signals to indicate the presence or absence of in-beam desired speech and the second voice detection signal is generated using the plurality of received signals to indicate the presence or absence of out-of-beam noise when in-beam desired speech is absent. A reference signal based on the first voice detection signal, the plurality of received signals and a beamformed signal is generated, in which the reference signal has the desired speech suppressed. The beamformed signal is generated based on the second voice detection signal, the reference signal, and the plurality of received signals, wherein the beamformed signal has noise suppressed. Noise in the beamformed signal is further suppressed using a multi-channel noise suppressor to generate an output signal. A reliability detection signal is generated indicating the reliability of each frequency subband. The first voice detection signal, the second voice detection signal, the reliability detection signal and the output signal are provided to a speech recognition engine.

The first voice detection signal is preferably determined based on a ratio of the total power of the received signal over noise power, while the second voice detection signal is preferably determined based on a ratio of cross-correlation between a desired signal and a main signal over total power.

In embodiments of the present invention, the steps of generating the reference signal and the beamformed signal use time-domain signal processing, while the step of further suppressing the noise in the beamformed signal is performed using frequency-domain signal processing.

Preferably, a noise suppression control signal is generated to control the level of noise suppression performed by the multi-channel noise suppressor. A step of providing a mixed output signal of specified format using the output signal, the reliability detection signal, and the first and second voice detection signals is also performed in an embodiment of the present invention.

Various other aspects, embodiments, and features of the invention are also provided, as described in further detail below.

DETAILED DESCRIPTION OF THE INVENTION

For clarity, various signals and controls described herein are labeled with lower case and upper case symbols. Time-variant signals and controls are labeled with "(n)" and "(m)", where n denotes sample time and m denotes frame index. A frame is composed of L samples. Frequency-variant signals and controls are labeled with "(k,m)", where k denotes frequency bin. Lower case symbols (e.g., s(n) and d(m)) are used to denote time-domain signals, and upper case symbols (e.g., $B(k,m)$) are used to denote frequency-domain signals.

As used herein, the term "noise" is used to refer to all unwanted signals, regardless of the source. Such signals could include random noise, unwanted speech from other sources and/or interference from other audio sources.

The present invention describes noise cancellation techniques by processing an audio signal comprising desired speech and unwanted noise received by using an array microphone. An array microphone forms a beam by utilizing the spatial information of multiple microphones at different positions or with different polar patterns. The beam is preferably pointed to the desired speech to enhance it and at same time to suppress all sounds from outside of the beam. The term "in-beam" refers to the speech or sound inside the beam, while the "out-of-beam" refers to the sounds outside of the beam. The techniques of the present invention are effective for use with a speech recognition engine to achieve improved speech recognition in adverse environments where single microphone systems and conventional array microphone systems do not perform well. Embodiments of the present invention provide an improved noise suppression system that adapts to different environments, voice quality and speech recognition performance. The present invention provides improvements that are highly desirable for speech input and hands-free communications and voice-controlled applications.

Figure 1:
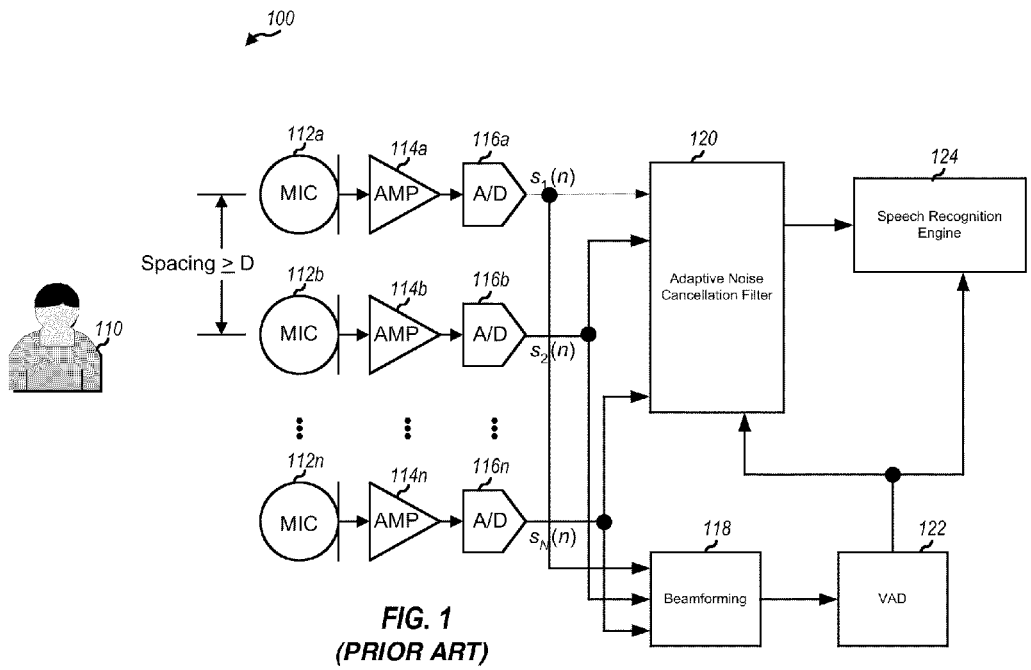
FIG. 1 shows a block diagram of a prior art array microphone.
Figure 2:
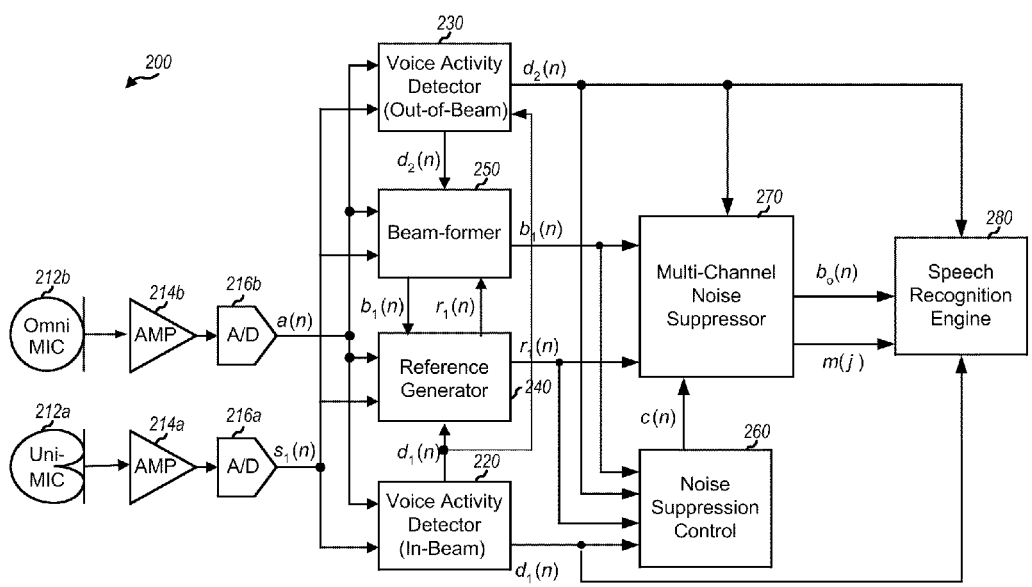
FIG. 2 shows a block diagram of a small array microphone system in accordance with an embodiment of the present invention.

FIG. 2 shows a block diagram of an embodiment of a small array microphone system 200. In general, a small array microphone system of the present invention can include any number of microphones greater than one. In embodiments of the present invention, the microphones in system 200 may be placed closer than the minimum spacing distance D required by conventional array microphone system 100. Moreover, the microphones may be any combination of omni-directional microphones and unidirectional microphones, where an omni-directional microphone picks up signal and noise from all directions, and a unidirectional microphone picks up signal and noise from the direction pointed to by its main lobe.

For example, in an embodiment of the present invention including two microphones, one can be a unidirectional microphone faced toward the desired sound source and the other can be an omni-directional microphone. Alternately, both can be unidirectional microphones, one facing toward the desired sound source and the other facing away from the desired sound source. In yet another embodiment, two omni-directional microphones can be utilized. For example, in the case of one unidirectional microphone and one omni-directional microphone, the unidirectional microphone may be a simple unidirectional microphone, or may formed by two omni-directional microphones. One simple example of two omni-directional microphones forming a unidirectional microphone is the arrangement of two omni-directional microphones in a line pointed to the source of the desired sound separated by a suitable distance. The signal received by the front microphone is subtracted from that of the back microphone to get the signal received by an equivalent unidirectional microphone. In such an example, the formed unidirectional microphone can be used as the unidirectional microphone of the embodiment and the front or back omni-directional microphone can be used as the omni-directional microphone of the embodiment. In this embodiment, the unidirectional microphone facing towards the desired sound is referred as the first chancel and the omni-directional microphone is referred as the second channel.

For clarity, an exemplary small array microphone system with two microphones is specifically described below.

In an embodiment of the present invention shown in FIG. 2, system 200 includes an array microphone that is composed of two microphones 212a and 212b. More specifically, system 200 includes one omni-directional microphone 212b and one unidirectional microphone 212a. As noted above, the unidirectional microphone 212a may be formed by two or more omni-directional microphones. In such case, the omni-directional microphone 212b can be another omni-directional microphone or the one of the omni-directional microphones that form the unidirectional microphone 212a. In this embodiment, omni-directional microphone 212b is referred to as the reference microphone and is used to pick up desired voice signal as well as noise and interference. Uni-directional microphone 212a is the main microphone that has its main lobe facing toward a desired talking user to pick up mainly desired speech.

Microphones 212a and 212b provide two received signals, which are amplified by amplifiers 214a and 214b, respectively. An ADC (audio-to-digital converter) 216a receives and digitizes the amplified signal from amplifier 214a and provides a main signal $s_1(n)$. An ADC 216b receives and digitizes the amplified signal from amplifier 214b and provides a secondary signal $a(n)$. However, it is understood that in other embodiments, the main signal may be provided by a unidirectional microphone facing the desired speech source, and the secondary signal may be provided by a unidirectional microphone facing away from the desired speech source. In still other embodiments, the main signal may be provided by an omni-directional microphone, and the secondary signal may be provided by at least one unidirectional microphone facing away from the desired speech source.

A first voice activity detector (VAD1) 220 receives the main signal $s_1(n)$ and the secondary signal $\alpha(n)$. VAD1 220 detects for the presence of near-end desired speech inside beam based on a metric of total power over noise power, as described below. VAD1 220 provides a in-beam speech detection signal $d_1(n)$, which indicates whether or not near-end desired speech inside beam is detected.

A second voice activity detector (VAD2) 230 receives the main signal $s_1(n)$, the secondary signal $a(n)$, and in-beam speech detection signal $d_1(n)$. VAD2 230 detects for the absence of near-end desired speech and the presence of noise/interference out of beam based on a metric of the cross-correlation between the main signal and the desired speech signal over the total power, as described below. VAD2 230 provides an out-of-beam noise detection signal $d_2(n)$, which indicates whether noise/interference out of beam is present when near-end voice is absent.

A reference generator 240 receives the main signal $s_1(n)$, the secondary signal $\alpha(n)$, the in-beam speech detection signal $d_1(n)$, and a beamformed signal $b_1(n)$. Reference generator 240 updates its coefficients based on the in-beam speech detection signal $d_1(n)$, detects for the desired speech in the main signal $s_1(n)$, the secondary signal $\alpha(n)$, and the beamformed signal $b_1(n)$, cancels the desired voice signal from the secondary signal $\alpha(n)$, and provides a reference signal $r_1(n)$. The reference signal $r_1(n)$ contains mostly noise and interference.

A beamformer 250 receives the main signal $s_1(n)$, the secondary signal $\alpha(n)$, the reference signal $r_1(n)$, and the out-of-beam noise detection signal $d_2(n)$. Beamformer 250 updates its coefficients based on the out-of-beam noise detection signal $d_2(n)$, detects for the noise and interference in the secondary signal $\alpha(n)$ and the reference signal $r_1(n)$, cancels the noise and interference from the main signal $s_1(n)$, and provides the beamformed signals $b_1(n)$. The beamformed signal comprises mostly desired speech.

A noise suppression controller 260 receives signals $d_1(n)$, $d_2(n)$, $r_1(n)$ and $b_1(n)$ and generates a control signal $c(n)$.

A multi-channel noise suppressor 270 receives the beamformed signal $b_1(n)$ and the reference signal $r_1(n)$. The multi-channel noise suppressor 270 uses a multi-channel fast Fourier transform (FFT) transforms the beamformed signal $b_1(n)$ and the reference signal $r_1(n)$ from the time domain to the frequency domain using an L-point FFT and provides a corresponding frequency-domain beamformed signal $B(k,m)$ and a corresponding frequency-domain reference signal $R(k,m)$. The in-beam speech detection signal $d_1(n)$ and the out-of-beam noise detection signal $d_2(n)$ are transferred to functions of frame index m, i.e., $d_1(m)$ and $d_2(m)$, instead of sample index n in the noise suppressor 270. The noise suppressor 270 further suppresses noise and interference in the signal $B(k,m)$ and provides a frequency-domain output signal $B_o(k,m)$ having much of the noise and interference suppressed. An inverse FFT in the noise suppressor 270 receives the frequency-domain output signal $B_o(k,m)$, transforms it from the frequency domain to the time domain using an L-point inverse FFT, and provides a corresponding time-domain output signal $b_o(n)$. Furthermore, a speech reliability detector generates a detection signal $m(j)$ to indicate the reliability of each frequency subband.

The output signal $b_o(n)$ may provide to a speech recognition system with digital format or may be converted to an analog signal, amplified, filtered, and so on, and provided to a speech recognition system 280. In embodiments of the present invention, speech recognition engine 280 receives the processed speech signal $b_o(n)$ with suppressed noise, the speech reliability detection signal $m(j)$, the in-beam speech detection signal $d_1(n)$ and the out-of-beam noise detection signal $d_2(n)$ to perform speech recognition.

Figure 3:
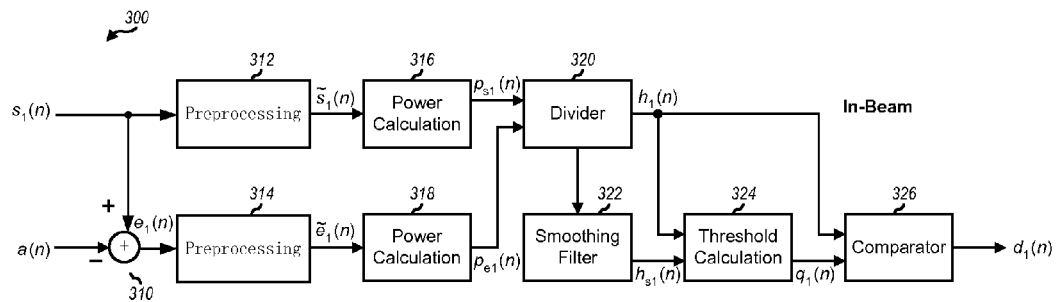
FIGS. 3 and 4 show block diagrams of voice activity detectors in accordance with an embodiment of the present invention.

FIG. 3 shows a block diagram of a voice activity detector (VAD1) 300, which is an exemplary embodiment of VAD1

220 in FIG. 2. For this embodiment, VAD1 300 detects for the presence of near-end desired speech inside beam based on (1) the total power of the main signal $s_1(n)$, (2) the noise power obtained by subtracting the secondary signal $\alpha(n)$ from the main signal $s_1(n)$, and (3) the power ratio between the total power obtained in (1) and the noise power obtained in (2).

Within VAD1 300, a subtraction unit 310 subtracts the secondary signal $\alpha(n)$ from the main signal $s_1(n)$ and provides a first difference signal $e_1(n)$, which is $e_1(n)=s_1(n)-\alpha(n)$. The first difference signal $e_1(n)$ contains mostly noise and interference. Preprocessing units 312 and 314 respectively receive the signals $s_1(n)$ and $e_1(n)$, filter these signals with the same set of filter coefficients to remove low frequency components, and provide filtered signals $\tilde{s}_1(n)$ and $\tilde{e}_1(n)$, respectively. Power calculation units 316 and 318 then respectively receive the filtered signals $\tilde{s}_1(n)$ and $\tilde{e}_1(n)$, compute the powers of the filtered signals, and provide computed powers $p_{s1}(n)$ and $p_{e1}(n)$, respectively. Power calculation units 316 and 318 may further average the computed powers. In this case, the averaged computed powers may be expressed as:

$$p_{s1}(n)=\alpha_1 \cdot p_{s1}(n-1)+(1-\alpha_1)\cdot \tilde{s}_1(n)\cdot \tilde{s}_1(n), \text{and} \qquad \text{Eq (1a)}$$

$$p_{e1}(n)=\alpha_1 \cdot p_{e1}(n-1)+(1-\alpha_1)\cdot \tilde{e}_1(n)\cdot \tilde{e}_1(n), \qquad \text{Eq (1b)}$$

where $\alpha_1$ is a constant that determines the amount of averaging and is selected such that $0<\alpha_1<1$. A large value for $\alpha_1$ corresponds to more averaging and smoothing. The term $p_{s1}(n)$ includes the total power from the desired speech signal inside beam as well as noise and interference. The term $p_{e1}(n)$ includes mostly noise and interference power.

A divider unit 320 then receives the averaged powers $p_{s1}(n)$ and $p_{e1}(n)$ and calculates a ratio $h_1(n)$ of these two powers. The ratio $h_1(n)$ may be expressed as:

$$h_1(n)=\frac{p_{s1}(n)}{p_{e1}(n)}. \qquad \text{Eq (2)}$$

The ratio $h_1(n)$ indicates the amount of total power relative to the noise power. A large value for $h_1(n)$ indicates that the total power is large relative to the noise power, which may be the case if near-end desired speech is present inside beam. A larger value for $h_1(n)$ corresponds to higher confidence that near-end desired speech is present inside beam.

A smoothing filter 322 receives and filters or smoothes the ratio $h_1(n)$ and provides a smoothed ratio $h_{s1}(n)$. The smoothing may be expressed as:

$$h_{s1}(n)=\alpha_{h1}\cdot h_{s1}(n-1)+(1-\alpha_{h1})\cdot h_1(n), \qquad \text{Eq (3)}$$

where $\alpha_{h1}$ is a constant that determines the amount of smoothing and is selected as $1<\alpha_{h1}<1$.

A threshold calculation unit 324 receives the instantaneous ratio $h_1(n)$ and the smoothed ratio $h_{s1}(n)$ and determines a threshold $q_1(n)$. To obtain $q_1(n)$, an initial threshold $q_1'(n)$ is first computed as:

$$q_1'(n)=\begin{cases} \alpha_{h1}\cdot q_1'(n-1)+(1-\alpha_{h1})\cdot h_1(n), & \text{if } h_1(n)>\beta_1 h_{s1}(n) \\ q_1'(n-1), & \text{if } h_1(n)\leq \beta_1 h_{s1}(n) \end{cases}, \qquad \text{Eq (4)}$$

where $\beta_1$ is a constant that is selected such that $\beta_1>0$. In equation (4), if the instantaneous ratio $h_1(n)$ is greater than $\beta_1 h_{s1}(n)$, then the initial threshold $q_1'(n)$ is computed based on the instantaneous ratio $h_1(n)$ in the same manner as the smoothed ratio $h_{s1}(n)$. Otherwise, the initial threshold for the prior sample period is retained (i.e., $q_1'(n)=q_1'(n-1)$) and the initial threshold $q_1'(n)$ is not updated with $h_1(n)$. This prevents the threshold from being updated under abnormal condition for small values of $h_1(n)$.

The initial threshold $q_1'(n)$ is further constrained to be within a range of values defined by $Q_{max1}$ and $Q_{min1}$. The threshold $q_1(n)$ is then set equal to the constrained initial threshold $q_1'(n)$, which may be expressed as:

$$q_1(n)=\begin{cases} Q_{max1}, & \text{if } q_1'(n)>Q_{max1}, \\ q_1'(n), & \text{if } Q_{max1}\geq q_1'(n)\geq Q_{min1}, \text{and} \\ Q_{min1}, & \text{if } Q_{min1}>q_1'(n), \end{cases} \qquad \text{Eq (5)}$$

where $Q_{max1}$ and $Q_{min1}$ are constants selected such that $Q_{max1}>Q_{min1}$.

The threshold $q_1(n)$ is thus computed based on a running average of the ratio $h_1(n)$, where small values of $h_1(n)$ are excluded from the averaging. Moreover, the threshold $q_1(n)$ is further constrained to be within the range of values defined by $Q_{max1}$ and $Q_{min1}$. The threshold $q_1(n)$ is thus adaptively computed based on the operating environment.

A comparator 326 receives the ratio $h_1(n)$ and the threshold $q_1(n)$, compares the two quantities $h_1(n)$ and $q_1(n)$, and provides the first voice detection signal $d_1(n)$ based on the comparison results. The comparison may be expressed as:

$$d_1(n)=\begin{cases} 1, & \text{if } h_1(n)\geq q_1(n), \\ 0, & \text{if } h_1(n)<q_1(n). \end{cases} \qquad \text{Eq (6)}$$

The voice detection signal $d_1(n)$ is set to 1 to indicate that near-end desired speech is detected inside beam and set to 0 to indicate that near-end desired voice is not detected.

Figure 4:
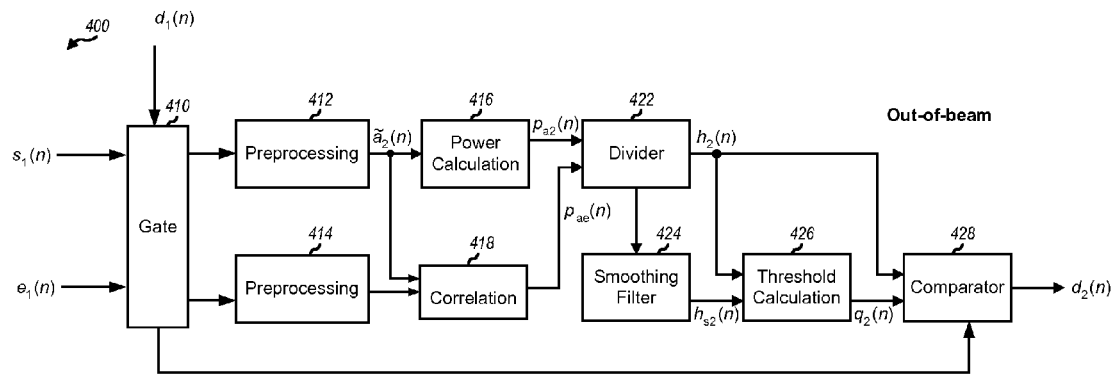

FIG. 4 shows a block diagram of a voice activity detector (VAD2) 400, which is an exemplary embodiment of VAD2 230 in FIG. 2. For this embodiment, VAD2 400 detects for the absence of near-end desired speech and the presence of interference and noise out-of-beam based on (1) the VAD1 signal $d_1(n)$, (2) the total power of the main signal $s_1(n)$, (3) the cross-correlation between the main signal $s_1(n)$ and the signal $e_1(n)$ obtained by subtracting the main signal $s_1(n)$ from the secondary signal $\alpha(n)$ in FIG. 3, and (4) the ratio of the cross-correlation obtained in (3) over the total power obtained in (2).

Within VAD2 400, a gate 410 receives the VAD1 $d_1(n)$ to do the following judgment, i.e., $d_1(n)=1$, i.e., in-beam desired speech is detected, $d_2(n)=0$, i.e., out-of-beam speech detection is not operated and set to off.

$d_1(n)=0$, i.e., in-beam desired speech is not detected, the VAD2 is operated.

The preprocessing units 412 and 414 respectively receive the main signal $s_1(n)$ and the signal $e_1(n)$, filter these signals with the same set of filter coefficients to remove low frequency components, and provide filtered signals $\tilde{s}_2(n)$ and $\tilde{e}_2(n)$, respectively. The filter coefficients used for preprocessing units 412 and 414 may be the same or different from the filter coefficients used for preprocessing units 312 and 314.

A power calculation unit 416 receives the filtered signal $\tilde{s}_2(n)$, computes the power of this filtered signal, and provides the computed power $p_{s2}(n)$. A correlation calculation unit 418 receives the filtered signals $\tilde{s}_2(n)$ and $\tilde{e}_2(n)$, computes their cross correlation, and provides the correlation $p_{se}(n)$. Units 416 and 418 may further average their computed results. In this case, the averaged computed power from unit 416 and the averaged correlation from unit 418 may be expressed as:

$$p_{s2}(n) = \alpha_2 \cdot p_{s2}(n-1) + (1-\alpha_2) \cdot \tilde{s}_2(n) \cdot \tilde{s}_2(n), \text{and} \quad \text{Eq (7a)}$$

$$p_{se}(n) = \alpha_2 \cdot p_{se}(n-1) + (1-\alpha_2) \cdot \tilde{s}_2(n) \cdot \tilde{e}_2(n), \quad \text{Eq (7b)}$$

where $\alpha_2$ is a constant that is selected such that $0 < \alpha_2 < 1$. The constant $\alpha_2$ for VAD2 400 may be the same or different from the constant $\alpha_1$ for VAD1 300. The term $p_{s2}(n)$ includes the total power for the desired speech signal as well as noise and interference. The term $p_{se}(n)$ includes the correlation between $\tilde{s}_2(n)$ and $\tilde{e}_2(n)$, which is typically negative if near-end desired speech is present.

A divider unit 420 then receives $p_{s2}(n)$ and $p_{se}(n)$ and calculates a ratio $h_2(n)$ of these two quantities, as follows:

$$h_2(n) = \frac{p_{se}(n)}{p_{s2}(n)}. \quad \text{Eq (8)}$$

A smoothing filter 422 receives and filters the ratio $h_2(n)$ to provide a smoothed ratio $h_{s2}(n)$, which may be expressed as:

$$h_{s2}(n) = \alpha_{h2} \cdot h_{s2}(n-1) + (1-\alpha_{h2}) \cdot h_2(n), \quad \text{Eq (9)}$$

where $\alpha_{h2}$ is a constant that is selected such that $0 < \alpha_{h2} < 1$. The constant $\alpha_{h2}$ for VAD2 400 may be the same or different from the constant $\alpha_{h1}$ for VAD1 300.

A threshold calculation unit 424 receives the instantaneous ratio $h_2(n)$ and the smoothed ratio $h_{s2}(n)$ and determines a threshold $q_2(n)$. To obtain $q_2(n)$, an initial threshold $q_2'(n)$ is first computed as:

$$q_2'(n) = \begin{cases} \alpha_{h2} \cdot q_2'(n-1) + (1-\alpha_{h2}) \cdot h_2(n), & \text{if } h_2(n) > \beta_2 h_{s2}(n), \\ q_2'(n-1), & \text{if } h_2(n) \le \beta_2 h_{s2}(n), \end{cases} \quad \text{Eq (10)}$$

where $\beta_2$ is a constant that is selected such that $\beta_2 > 0$. The constant $\beta_2$ for VAD2 400 may be the same or different from the constant $\beta_1$ for VAD1. In equation (10), if the instantaneous ratio $h_2(n)$ is greater than $\beta_2 h_{s2}(n)$, then the initial threshold $q_2'(n)$ is computed based on the instantaneous ratio $h_2(n)$ in the same manner as the smoothed ratio $h_{s2}(n)$. Otherwise, the initial threshold for the prior sample period is retained.

The initial threshold $q_2'(n)$ is further constrained to be within a range of values defined by $Q_{max2}$ and $Q_{min2}$. The threshold $q_2(n)$ is then set equal to the constrained initial threshold $q_2'(n)$, which may be expressed as:

$$q_2(n) = \begin{cases} Q_{max2}, & \text{if } q_2'(n) > Q_{max2}, \\ q_2'(n), & \text{if } Q_{max2} \ge q_2'(n) \ge Q_{min2}, \text{ and} \\ Q_{min2}, & \text{if } Q_{min2} > q_2'(n), \end{cases} \quad \text{Eq (11)}$$

where $Q_{max2}$ and $Q_{min2}$ are constants selected such that $Q_{max2} > Q_{min2}$.

A comparator 426 receives the ratio $h_2(n)$ and the threshold $q_2(n)$ compares the two quantities $h_2(n)$ and $q_2(n)$, and provides the second voice detection signal $d_2(n)$ based on the comparison results. The comparison may be expressed as:

$$d_2(n) = \begin{cases} 1, & \text{if } h_2(n) \ge q_2(n), \\ 0, & \text{if } h_2(n) < q_2(n). \end{cases} \quad \text{Eq (12)}$$

The voice detection signal $d_2(n)$ is set to 1 to indicate that out-of-beam interference and noise is present and at same time near-end desired speech is absent.

Figure 5:
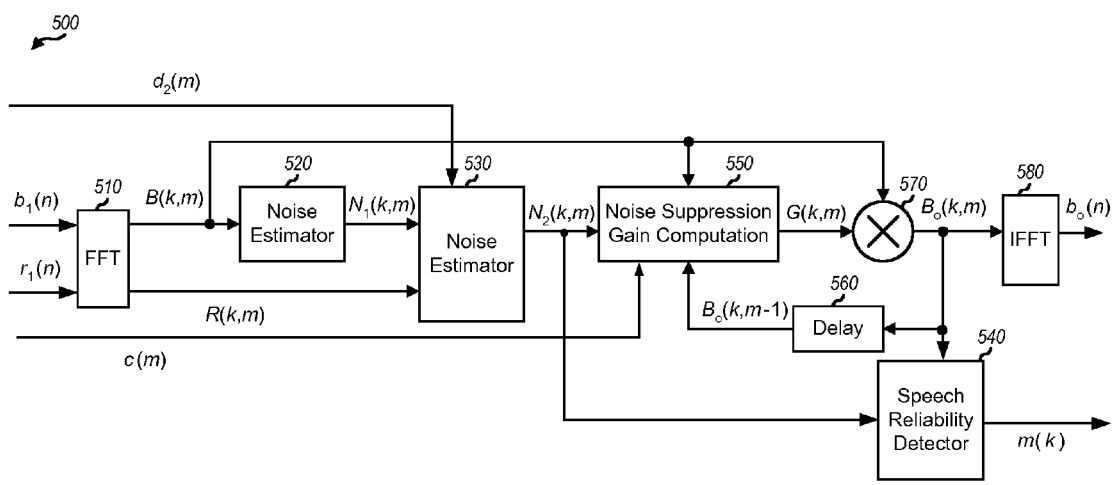
FIG. 5 shows a block diagram of a multi-channel noise suppressor in accordance with an embodiment of the present invention.

FIG. 5 shows a block diagram of a multi-channel noise suppressor 500, which is an exemplary embodiment of multi-channel noise suppressor 270 in FIG. 2. The operation of noise suppressor 500 is controlled by the noise suppression control signal c(m), which is transferred from c(n) in time domain to transformed domain.

Within noise suppressor 500, a multi-channel FFT unit 510 transforms the output of beamformer 250, $b_1(n)$, and the output of reference generator 240, $r_1(n)$, into frequency domain beamformed signal B(k,m) and the frequency-domain reference signal R(k,m). A first noise estimator 520 receives the frequency domain beamformed signal B(k,m) and then estimates the magnitude of the noise in the signal B(k,m), and provides a frequency-domain noise signal $N_1(k,m)$. The first noise estimation may be performed using a minimum statistics based method or some other method, as is known in the art. One such method is described in "Spectral subtraction based on minimum statistics," by R. Martin, European Signal Processing Conference (EUSIPCO), 1994, pp. 1182-1185, September 1994. A second noise estimator 530 receives the noise signal $N_1(k,m)$, the frequency-domain reference signal R(k,m), and the voice detection signal $d_2(m)$, which is transferred from $d_2(n)$ in time domain to transformed domain. The second noise estimator 530 determines a final estimate of the noise in the signal B(k,m) and provides a final noise estimate $N_2(k,m)$, which may be expressed as:

$$N_2(k,m) = \begin{cases} \gamma_{a1} \cdot N_1(k,m) + \gamma_{a2} \cdot |R(k,m)|, & \text{if } d_2(m) = 0, \\ \gamma_{b1} \cdot N_1(k,m) + \gamma_{b2} \cdot |R(k,m)|, & \text{if } d_2(m) = 1, \end{cases} \quad \text{Eq (13)}$$

where $\gamma_{a1}, \gamma_{a2}, \gamma_{b1},$ and $\gamma_{b2}$ are constants and are selected such that $\gamma_{a1} > \gamma_{b1} > 0$ and $\gamma_{b2} > \gamma_{a2} > 0$. As shown in equation (19), the final noise estimate $N_2(k,m)$ is set equal to the sum of a first scaled noise estimate, $\gamma_{x1} \cdot N_1(k,m)$, and a second scaled noise estimate, $\gamma_{x2} \cdot |R(k,m)|$, where $\gamma_x$ can be equal to $\gamma_a$ or $\gamma_b$. The constants $\gamma_{a1}, \gamma_{a2}, \gamma_{b1},$ and $\gamma_{b2}$ are selected such that the final noise estimate $N_2(k,m)$ includes more of the noise estimate $N_1(k,m)$ and less of the reference signal magnitude $|R(k,m)|$ when $d_2(m)=0$, indicating that out-of-beam noise or interference is detected. Conversely, the final noise estimate $N_2(k,m)$ includes less of the noise estimate $N_1(k,m)$ and more of the reference signal magnitude $|R(k,m)|$ when $d_2(m)=1$, indicating that out-of-beam noise or interference is not detected.

A noise suppression gain computation unit 550 receives the frequency-domain beamformed signal B(k,m), the final noise estimate $N_2(k,m)$, and the frequency-domain output signal $B_o(k,m-1)$ for a prior frame from a delay unit 560. Computation unit 550 computes a noise suppression gain G(k,m) that is used to suppress additional noise and interference in the signal B(k,m).

To obtain the gain G(k,m), an SNR estimate $G_{SNR,B}'(k,m)$ for the beamformed signal B(k,m) is first computed as follows:

$$G'_{SNR,B}(k,m) = \frac{|B(k,m)|}{N_2(k,m)} - 1. \qquad \text{Eq (14)}$$

The SNR estimate $G_{SNR,B}'(k,m)$ is then constrained to be a positive value or zero, as follows:

$$G_{SNR,B}(k,m) = \begin{cases} G'_{SNR,B}(k,m), & \text{if } G'_{SNR,B}(k,m) \geq 0, \\ 0, & \text{if } G'_{SNR,B}(k,m) < 0. \end{cases} \qquad \text{Eq (15)}$$

A SNR estimate $G_{SNR}(k,m)$ is then computed as follows:

$$G_{SNR}(k,m) = \frac{\lambda \cdot |B_o(k,m-1)|}{N_2(k,m)} + (1-\lambda) \cdot G_{SNR,B}(k,m), \qquad \text{Eq (16)}$$

where $\lambda$ is a positive constant that is selected such that $1 > \lambda > 0$. As shown in equation (22), the final SNR estimate $G_{SNR}(k,m)$ includes two components. The first component is a scaled version of an SNR estimate for the output signal in the prior frame, i.e., $\lambda \cdot |B_o(k,m-1)|/N_2(k,m)$. The second component is a scaled version of the constrained SNR estimate for the beamformed signal, i.e., $(1-\lambda) \cdot G_{SNR,B}(k,m)$. The constant $\lambda$ determines the weighting for the two components that make up the final SNR estimate $G_{SNR}(k,m)$.

The gain $G_0(k,m)$ is computed as:

$$G_0(k,m) = \frac{G_{SNR}(k,m)}{1 + G_{SNR}(k,m)}. \qquad \text{Eq (17)}$$

The gain $G_0(k,m)$ is a real value and its magnitude is indicative of the amount of noise suppression to be performed. In particular, $G_0(k,m)$ is a small value for more noise suppression and a large value for less noise suppression.

The final gain $G(k,m)$ is then computed as $$G(k,m) = \begin{cases} \dfrac{G_{SNR}(k,m)}{\sigma + G_{SNR}(k,m)}, & \text{if } c(m) = 1, \\ G_0(k,m), & \text{if } c(m) = 0. \end{cases} \qquad \text{Eq (18)}$$

where $\sigma$ is a positive constant and $\sigma > 1$. When $c(m)=1$, $G(k,m)$ is more related to noise which means to suppresses more noise. When $c(m)=0$, $G(k,m)=G_0(k,m)$.

A multiplier 570 then multiples the frequency-domain beamformed signal $B(k,m)$ with the gain $G(k,m)$ to provide the frequency-domain output signal $B_o(k,m)$, which may be expressed as:

$$B_o(k,m) = B(k,m) \cdot G(k,m). \qquad \text{Eq (19)}$$

Output signal $B_o(k,m)$ is then received by inverse FFT 580, which outputs processed speech signal $b_0(n)$.

Figure 6:
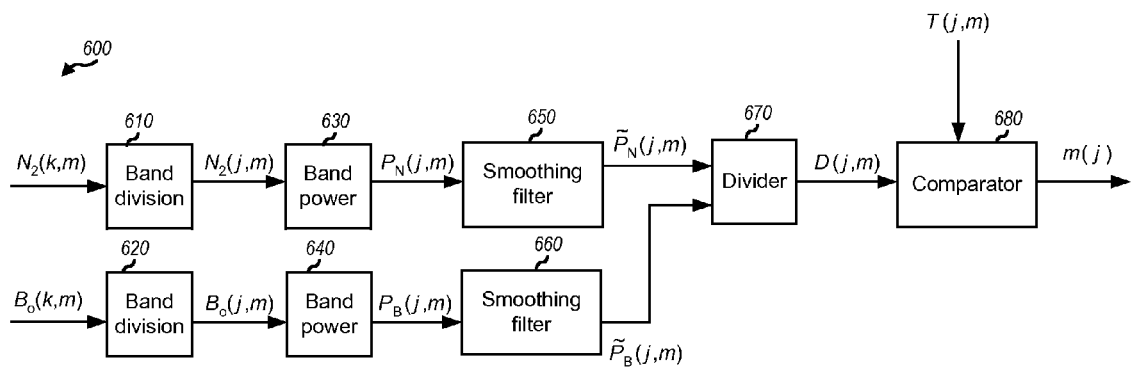
FIG. 6 shows a block diagram of a speech reliability detector in accordance with an embodiment of the present invention.

FIG. 6 shows a speech reliability detector 600 to indicate the reliability of each frequency subband for speech feature extraction in speech recognition machine. The band division units 610 and 620 receive $N_2(k,m)$ and $B_0(k,m)$, respectively, and do the band division based on speech feature extraction in speech recognition. The output of the division units 610 and 620 are $\tilde{N}_2(j,m)$ and $\tilde{B}_0(j,m)$, where j indicates the index of subband. The band power calculation units 630 and 640 use the signals $\tilde{N}_2(j,m)$ and $\tilde{B}_0(j,m)$, respectively, to calculate their powers, $P_N(j,m)$ and $P_B(j,m)$, respectively. The smoothing filters 650 and 660 further average the powers $P_N(j,m)$ and $P_B(j,m)$. The averaged computed powers may be expressed as:

$$\tilde{P}_N(j,m) = \alpha_N \cdot \tilde{P}_N(j,m-1) + (1-\alpha_N) \cdot P_N(j,m) \cdot P_N(j,m), \text{ and} \qquad \text{Eq (20a)}$$

$$\tilde{P}_B(j,m) = \alpha_B \cdot \tilde{P}_B(j,m-1) + (1-\alpha_B) \cdot P_B(j,m) \cdot P_B(j,m), \qquad \text{Eq (20b)}$$

where $\alpha_N$ and $\alpha_B$ are constants that determine the amount of averaging and is selected such that $0 < \alpha_N, \alpha_B < 1$. A large values for $\alpha_N$ and $\alpha_B$ correspond to more averaging and smoothing.

A divider 670 uses the smoothed powers $\tilde{P}_N(j,m)$ and $\tilde{P}_B(j,m)$ to get a power ratio $D(j,m)$. Then the power ratio $D(j,m)$ is compared with the predetermined threshold $T(j,m)$ to get a detection signal $m(j)$ to indicate the reliability of each frequency subband, which is sent to speech recognition system to improve feature extraction.

Figure 7:
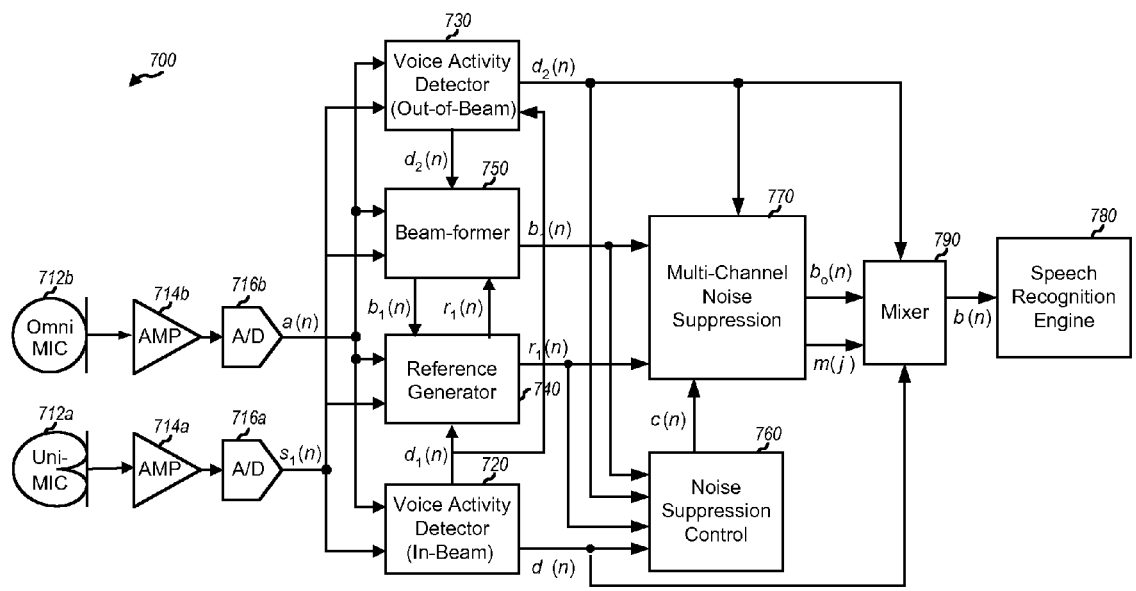
FIG. 7 shows a block diagram of a small array microphone system in accordance with another embodiment of the invention.

FIG. 7 shows a block diagram of another embodiment of a small array microphone system of the present invention. Like system 200, system 700 includes microphones 712a and 712b, amplifiers 714a and 714b, respectively, ADCs 716a and 716b, first voice activity detector (VAD1) 720, second voice activity detector (VAD2) 730, reference generator 740, beamformer 750, multi-channel noise suppressor 770, noise suppression controller 760, speech recognition engine 780, and mixer 790

Figure 8:
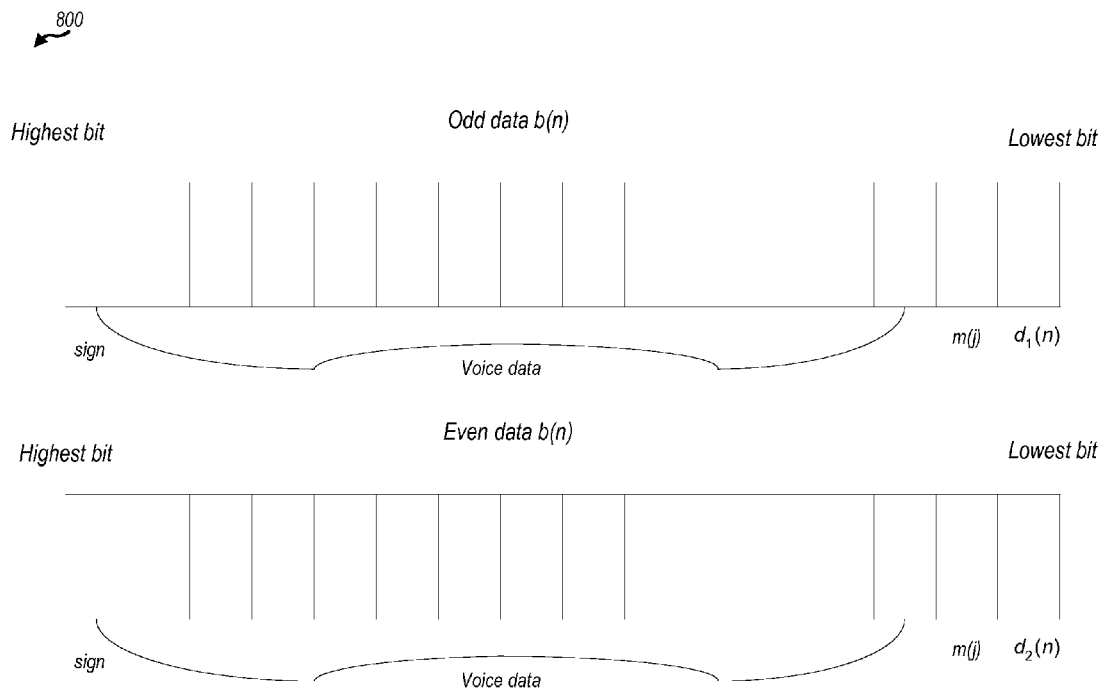
FIG. 8 shows a format for the output of a small array microphone system to a speech recognition system.

The difference between FIG. 7 and FIG. 2 is to add a mixer 790 to mix output signals $b_0(n)$, $m(j)$, $d_1(n)$ and $d_2(n)$ to form an output signal $b(n)$ with special format. FIG. 8 shows the format of the output signal from mixer 790. For odd data $b(n)$, $n=1, 3, 5, \ldots$, the highest 14 bits denote the real voice data for speech. The second lowest bit is used to put $m(j)$. The lowest bit is used to put $d_1(n)$. For even data $b(n)$, $n=0, 2, 4, \ldots$, the highest 14 bits also denote the real voice data for speech. The second lowest bit is used to put $m(j)$. The lowest bit is used to put $d_2(n)$.

Figure 9:
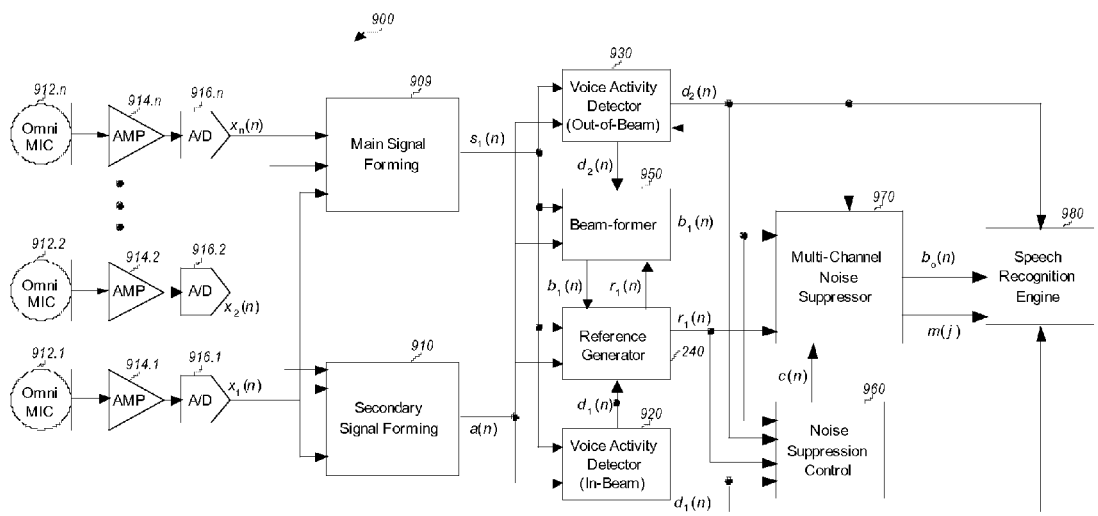
FIG. 9 shows a block diagram of a small array microphone system in accordance yet another embodiment of the present invention.

FIG. 9 shows a block diagram of yet another embodiment of a small array microphone system with multiple microphones. Like system 200, system 900 includes first voice activity detector (VAD1) 920, second voice activity detector (VAD2) 930, reference generator 940, beamformer 950, multi-channel noise suppressor 970, noise suppression controller 960, and speech recognition engine 980. The differences between FIG. 9 and FIG. 2 are to have n microphones 912.1 to 912.n, n amplifiers 714.1 to 714.n, n ADCs 716.1 to 716.n and 716.n, and to add a main signal forming unit 909 and secondary signal forming unit 910 to form the main signal $s_1(n)$ and the secondary signal $\alpha(n)$.

Figure 10:
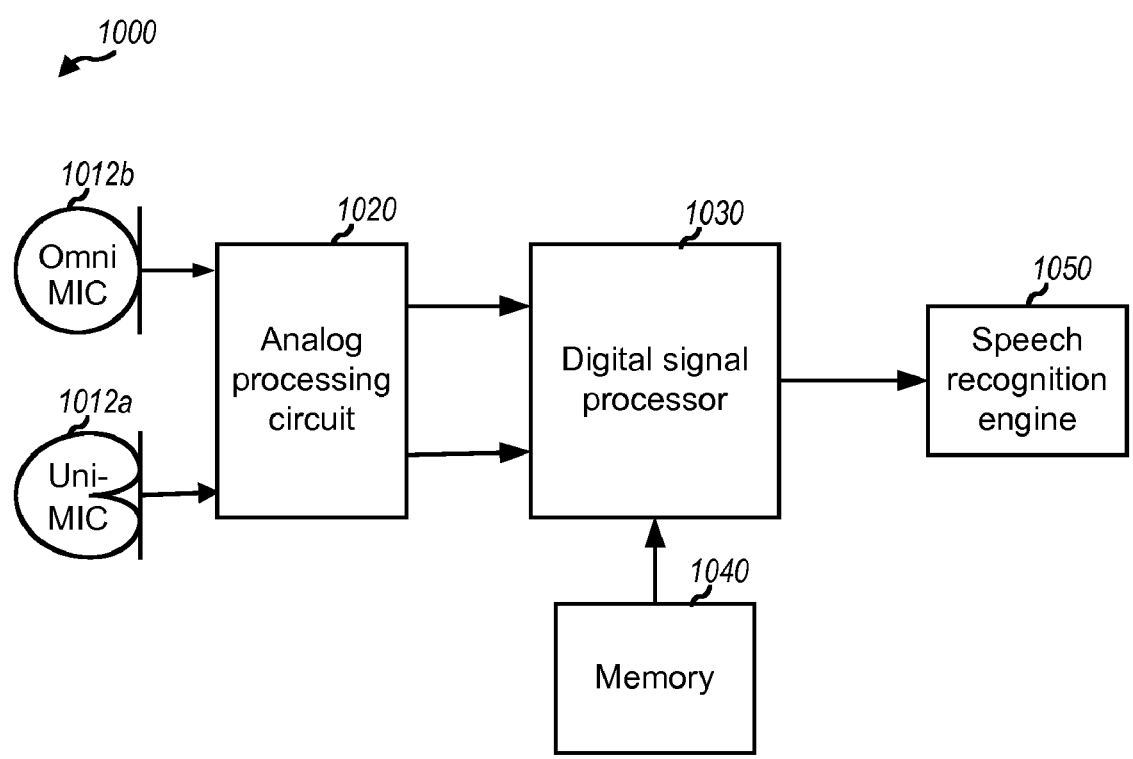
FIG. 10 shows a block diagram of a small array microphone system in accordance with still another embodiment of the present invention.

FIG. 10 shows a diagram of a system implementation of a small array microphone system 1000. In this implementation, system 1000 includes two microphones 1012a and 1012b, an analog processing unit 1020, a digital signal processor (DSP) 1030, and a memory 1040, as well as a speech recognition engine 1050. Microphones 1012a and 1012b may correspond to microphones 212a and 212b in FIG. 2. Analog processing unit 1020 performs analog processing and may include amplifiers 214a and 214b and ADCs 216a and 216b in FIG. 2. Digital signal processor 1030 may implement various processing units used for noise and interference suppression, such as VAD1 220, VAD2 230, reference generator 240, beamformer 250, multi-channel noise suppressor 270, noise suppression control 260 and speech recognition engine 280 in FIG. 2. Memory 1040 provides storage for program codes and data used by digital signal processor 1030.

The array microphone and noise suppression techniques described herein may be implemented by various means. For example, these techniques may be implemented in hardware, software, or a combination thereof. For a hardware implementation, the processing units used to implement the array microphone and noise suppression may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

For a software implementation, the array microphone and noise suppression techniques may be implemented with modules (e.g., procedures, functions, and so on) that perform the functions described herein. The software codes may be stored in a memory unit (e.g., memory unit 1040 in FIG. 10) and executed by a processor (e.g., DSP 1030).

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A small array microphone system for use with a speech recognition engine comprising:
    an array microphone comprising a plurality of microphones and operative to provide a plurality of received signals, each microphone providing one received signal;
    a first voice activity detector (VAD) operative to provide a first voice detection signal generated using the plurality of received signals to indicate the presence or absence of in-beam desired speech;
    a second VAD operative to provide a second voice detection signal generated using the plurality of received signals to indicate the presence or absence of out-of-beam noise when the in-beam desired speech is absent;
    wherein the first voice detection signal, the second voice detection signal, and an output signal are provided to the speech recognition engine.

2. The system of claim 1, further comprising:
    a reference signal generator operative to provide a reference signal based on the first voice detection signal, the plurality of received signals, and a beamformed signal, wherein the reference signal has the desired speech suppressed;
    a beamformer operative to provide the beamformed signal based on the second voice detection signal, the reference signal, and the plurality of received signals, wherein the beamformed signal has noise suppressed;
    a multi-channel noise suppressor operative to further suppress noise in the beamformed signal and provide the output signal; and
    a speech reliability detector operative to provide a reliability detection signal indicating the reliability of each frequency subband,
    wherein the first voice detection signal, the second voice detection signal, the reliability detection signal and the output signal are provided to the speech recognition engine.

3. The system of claim 1, wherein the first voice detection signal is determined based on a ratio of the total power of the received signals over noise power.

4. The system of claim 1, wherein the second voice detection signal is determined based on a ratio of cross-correlation between a desired signal and a main signal over total power.

5. The system of claim 1, wherein the beamformer is operative to provide beamformed signal substantially comprising desired speech.

6. The system of claim 1, wherein the plurality of signals comprise a main signal and at least one secondary signal.

7. The system of claim 6, wherein the main signal is provided by a uni-directional microphone facing the desired speech source, and the at least one secondary signal is provided by at least one omni-directional microphone.

8. The system of claim 6, wherein the main signal is provided by a uni-directional microphone facing the desired speech source, and the at least one secondary signal is provided by at least one uni-directional microphone facing away from the desired speech source.

9. The system of claim 6, wherein the main signal is provided by subtracting the signal provided by a front omni-directional microphone from the signal provided by a back omni-directional microphone, and the at least one secondary signal is the signal provided by one of the front omni-directional microphone and the back omni-directional microphone.

10. The system of claim 6, wherein the main signal is provided by an omni-directional microphone, and the at least one secondary signal is provided by at least one uni-directional microphone facing away from the desired speech source.

11. The system of claim 1, wherein the reference signal generator is operative to provide a reference signal substantially comprising noise.

12. The system of claim 1, further comprising a noise suppression controller operative to control the level of noise suppression performed by the multi-channel noise suppressor.

13. The system of claim 1, wherein the reference signal generator and the beamformer are operative to perform time-domain signal processing, and the multi-channel noise suppressor is operative to perform frequency domain signal processing.

14. The system of claim 1, further comprising a mixer operative to provide a mixed output signal of specified format to the speech recognition engine using the output signal, the reliability detection signal, and the first and second voice detection signals.

15. A noise suppression apparatus comprising:
    means for obtaining a plurality of received signals from a plurality of microphones forming an array microphone;
    means for providing a first voice detection signal based on the plurality of received signals to indicate the presence or absence of in-beam desired speech;
    means for providing a second voice detection signal based on the plurality of received signals to indicate the presence or absence of out-of-beam noise when in-beam desired speech is absent;
    means for providing a reference signal based on the first voice detection signal, the plurality of received signals, and a beamformed signal, wherein the reference signal has desired speech suppressed;
    means for providing a beamformed signal based on the second voice detection signal, the reference signal, and the plurality of received signals, wherein the beamformed signal has noise suppressed;
    means for suppressing additional noise in the beamformed signal to provide an output signal; and means for providing a reliability detection signal indicating the reliability of each frequency subband.

16. The noise suppression apparatus of claim 15, further comprising means for controlling the level of noise suppression.

17. The noise suppression apparatus of claim 15, wherein the first voice detection signal, the second voice detection signal, the reliability detection signal and the output signal are provide to a speech recognition engine.

18. The noise suppression apparatus of claim 17, further comprising means for providing a mixed output signal of specified format using the output signal, the reliability detection signal, and the first and second voice detection signals to a speech recognition engine.

19. A method of suppressing noise and interference in a small array microphone system, comprising:

obtaining a plurality of received signals from a plurality of microphones forming an array microphone;

generating first and second voice detection signals, wherein the first voice detection signal is generated using the plurality of received signals to indicate the presence or absence of in-beam desired speech and the second voice detection signal is generated using the plurality of received signals to indicate the presence or absence of out-of-beam noise when in-beam desired speech is absent;

generating a reference signal based on the first voice detection signal, the plurality of received signals, and a beamformed signal, wherein the reference signal has desired speech suppressed;

generating the beamformed signal based on the second voice detection signal, the reference signal, and the plurality of received signals, wherein the beamformed signal has noise suppressed;

further suppressing noise in the beamformed signal using a multi-channel noise suppressor to generate an output signal;

generating a reliability detection signal indicating the reliability of each frequency subband; and providing the first voice detection signal, the second voice detection signal, the reliability detection signal and the output signal to a speech recognition engine.

20. The method of claim 19, wherein the first voice detection signal is determined based on a ratio of the total power of the received signal over noise power.

21. The method of claim 19, wherein the second voice detection signal is determined based on a ratio of cross-correlation between a desired signal and a main signal over total power.

22. The method of claim 19, wherein the steps of generating the reference signal and the beamformed signal use time-domain signal processing, and wherein the step of further suppressing the noise in the beamformed signal is performed using frequency-domain signal processing.

23. The method of claim 19, further comprising the step of generating a noise suppression control signal to control the level of noise suppression performed by the multi-channel noise suppressor.

24. The method of claim 19, further comprising the step of mixing the output signal of specified format using the output signal, the reliability detection signal, and the first and second voice detection signals to generate a mixed signal.

* * * * *